United States Patent Office 3,414,011
Patented Dec. 3, 1968

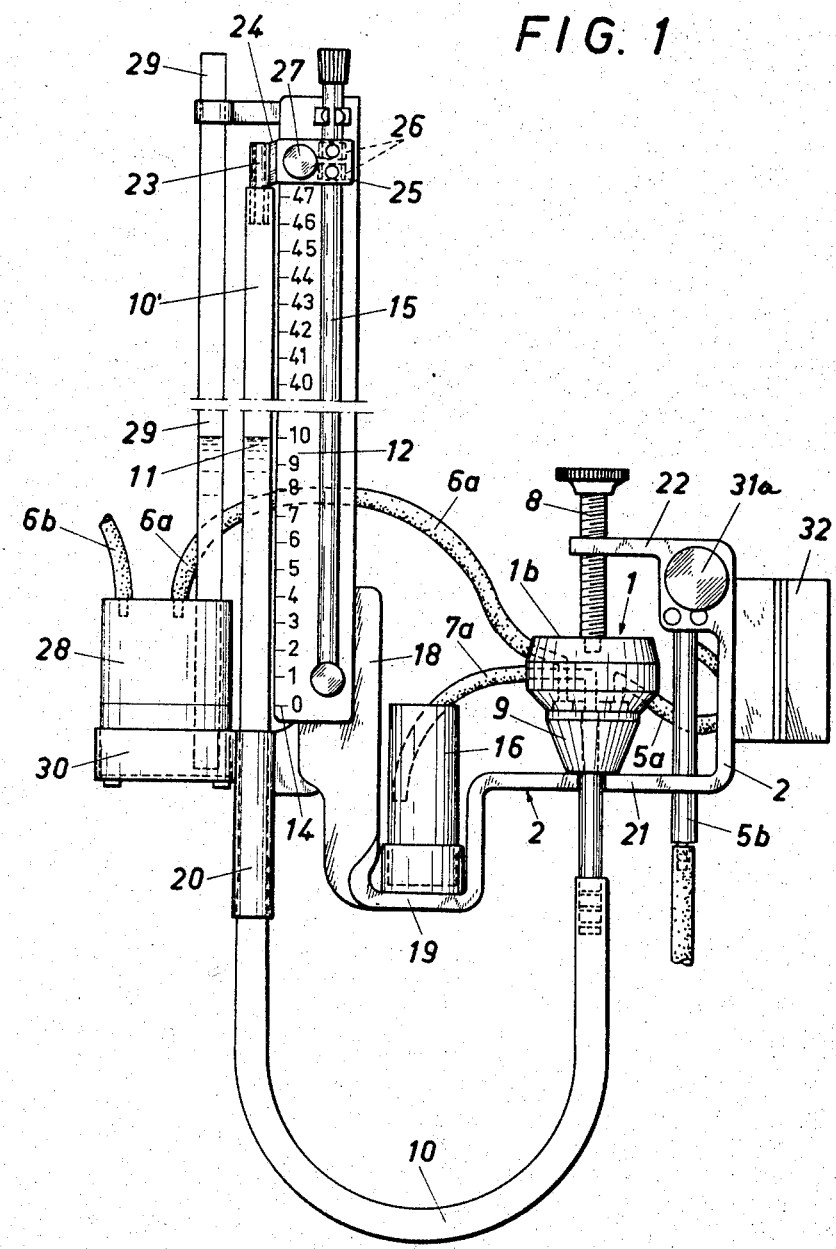

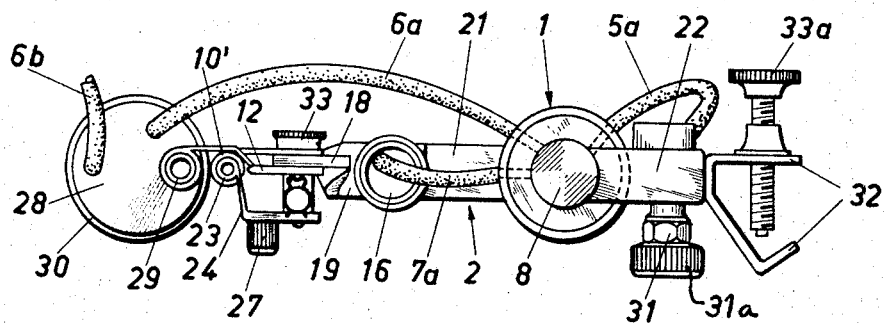
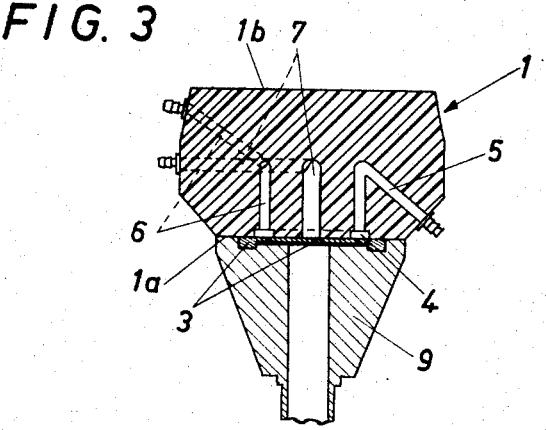
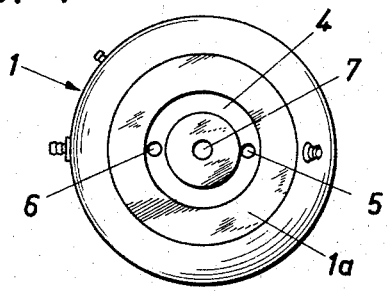

3,414,011
DEVICE TO CREATE AND AUTOMATICALLY MAINTAIN A PREDETERMINED GAS EXCESS PRESSURE IN CAVITIES
Goran Olof Uddenberg, Goteborg, Sweden, assignor to Aktiebolaget Vacuum-Extractor, a corporation of Sweden
Filed May 4, 1966, Ser. No. 547,647
Claims priority, application Sweden, May 6, 1965, 5,922
4 Claims. (Cl. 137—510)

ABSTRACT OF THE DISCLOSURE

The present device automatically maintains a predetermined excess gas pressure in cavities such as for example, normally closed cavities such as the abdomen of the human body so that the cavity can be visually inspected while inflated and containing interior illumination.

---

The present invention is concerned with a device for automatically maintaining a predetermined excess gas pressure in cavities.

In order to conduct an ocular inspection of the interior walls of normally closed cavities in the human body using an interior illumination thereof, said cavities should not be in a collapsed state, but should be inflated by an inert gas, usually carbon dioxide. Most frequently conducted examinations of this kind are concerned with the abdomen with the gas being introduced from a bottle of carbon dioxide at comparatively high pressure through a conduit provided with a manually operated valve. In prior examinations of this kind, during the whole procedure of the examination, it has been necessary to have an attendant manually operate said valve in order to carefully regulate the gas pressure so that it does not rise to a dangerous level. This results in possible severe risks, if the attendant is not very alert or is not sufficiently trained for this kind of service.

The present invention has as its principal object to eliminate this risk by providing a device to automatically maintain a predetermined excess gas pressure in cavities, for example in the human body, during operations, whereby gas from a gas source under excess pressure is conveyed to the cavity through a valve and a discharge conduit from this valve, and the invention is principally characterized by the fact that this valve consists of a diaphragm valve with a valve chamber provided in a valve body, said chamber being in connection on one hand with an inlet conduit connectable to a supply conduit from the gas source and on the other hand with a first normally always open gas outlet, connectable to a discharge conduit to the cavity, and moreover under the control of the diaphragm with a second outlet discharging independently outside of the cavity. Said second outlet is capable upon a reduction of the predetermined excess gas pressure to be closed by the diaphragm by the pressure exerted by a column of liquid in a tube conduit and, when the predetermined pressure is exceeded to open the second outlet when excess gas is conveyed through said second outlet without entering the cavity, until the pressure in the cavity falls below the predetermined pressure whereby the second outlet is closed by the diaphragm and gas again flows to the cavity through said first outlet.

Further objects of the present invention will be in part pointed out and in part obvious from the following detailed description of the accompanying drawings, wherein:

FIG. 1 is a side view of the present device;

FIG. 2 is a top view of the same device;

FIG. 3 is an enlarged fragmentary cross-sectional view of the valve forming part of the present device; and, FIG. 4 is an enlarged view of the underside of said valve body.

Referring now more particularly to the accompanying drawings, wherein like and corresponding parts are designated by similar reference characters, one of the principal parts of the present device is a valve body 1, supported by a frame 2 having a reversed C-shaped base having two parallel arms 21 and 22 respectively between which the valve is located. In the side 1a of the valve body, which in the normal position of the instrument in use constitutes the bottom side of the valve body, there is provided an annular recess 4 serving as the valve chamber, the underside of which is covered by a membrane or diaphragm 3 constituting the inferior wall of the valve chamber. This diaphragm can be made of rubber, plastics, or elastic material. The valve body is provided with three channels 5, 6, and 7 extending through said body. Of these channels, the one designated as 5 connects the valve chamber 4 to a pipe or tube conduit 5a in communication with a bottle of carbon dioxide (not shown) or other source of suitable compressed gas of higher pressure than the one desired in the body cavity. The channel designated by 6 is connected to a pipe or tube conduit 6a leading to the patient whereas the channel designated by 7 contacts the valve chamber 4 to a pipe or tube 7a constituting an independent or free drainage discharge outside of the body cavity and this discharge can, if desired, be introduced into a receptacle 16. The operating function of the channel 7 is controlled by the diaphragm 3.

The top side 1b of the valve body is under a pressure screw 8 in threaded engagement with the upper frame arm 22 for keeping the valve body 1 in position over and against seat 9 having the form of a conical casing or the like, which seat is mounted on the arm 21. The edge of the diaphragm 3 is clamped between said valve body and said seat which latter is connected to a flexible tube or hose conduit 10 having an end extending therethrough and a medial portion bent like a U and continuing upwards along the side of the valve body with an extended section 10'. This tube 10 is intended to be filled with a liquid 11, conveniently water, rising to a suitable height in the section 10' of said tube. This liquid exerts a pressure against the outside of the diaphragm 3, and the top of the liquid in said section 10' of the tube in cooperation with a vertical graduated measuring plate 12 serves as means for measuring the pressure acting on the underside of the diaphragm 3. The height of the column of liquid in the measuring section 10' of the tube is read by way of the scale of the plate 12 starting from zero point 14 which is on a level with the diaphragm 3. A rod 15 and the measuring plate 12 are fixed by a screw and nut 33 onto a support 18 fitted to the lower arm 21 of the frame. This support 18 is also designed to form a shelf 19 for the receptacle 16. On this support 18 is also fixed a vertical guiding sleeve 20 for the tube section 10', the upper end of which has a sliding connection with the rod 15. For this purpose in the upper open end of the tube section 10', there is partly inserted and fixed a sleeve 23 open at both ends. Said sleeve is mounted on one shank 24 of a support of angular shape having a second shank 25 carrying one or a plurality of clamping members 26, which partly embrace the rod 15 and with a resilient force keep the support 24, 25, which is provided with a small knob 27, in position in relation to the rod, but permitting the coaxial displacement of the tube section 10' to different heights in which said section is maintained by the resilient pressure of the clamping members 26. Thereby the flexible U-shaped part of the tube 10 can be positioned at any desired vertical distance from the horizontal level of the point 14 and the diaphragm 3.

The tube section or hose 6a can be directly introduced into the cavity of the body for example where the excess gas pressure will be automatically maintained, but in order to enable a closer control of the pressure in the body cavity the conduit 6a has its outlet in a closed receptacle 28 partially filled with water or other liquid and supported by a holder 30 fixed to the bracket 18. Into this receptacle 28 there extends the lower end of a vertical safety or control tube 29 with said tube being open at both ends and parallel to the tube section 10'. In addition, another tube 6b is connected to the top of the receptacle 28, which in its turn is intended to be lead into the body cavity. In the tube 29 the pressure of the water column corresponds under normal use to the pressure in the tube 10'.

To the frame 2 a valve 31, that is a needle valve, is secured, with said valve being adjustable by a valve handle 31a. From the outlet of this valve 31 a hose 5a leads to the channel 5 while to the inlet of the valve 31 a tube or hose 5b is connected, which communicates with the source of gas under pressure. A bracket 32 with a clamping screw 33a is fixedly attached to the frame and the means carried thereby can be mounted on a vertical stand (not shown).

When using the present instrument, that is connecting it to the abdomen of a patient, the tube section 10' is adjusted for the pressure desired to be maintained in the abdominal cavity for its inflated position. This pressure is indicated on the drawing by way of an example only to be a water column 10 cm., although in most cases in actual practice the pressure required might be considerably higher. The pressure can be modified in a most simple way when required by raising or lowering the tube section 10' by means of the knob 27. When this pressure of the liquid thus has been adjusted, it will through tube 10 influence the underside of the diaphragm 3, which in its turn will close the mouth of the channel 7 in the valve chamber 4, while the inlet of channel 5 into the chamber 4 and the outlet from chamber 4 by the channel 6 are unaffected by the diaphragm as shown in FIG. 3.

In this way, for the purpose of inflating the abdomen, the carbon dioxide will flow through the valve chamber 4 from the open intake conduits 5, 5a, 5b to the open discharge conduits 6, 6a, 6b to the body cavity while the diaphragm will keep closed the channel 7, and so the gas flow from the gas supply source will inflate the abdomen up to the pressure of a water column of 10 cm., mentioned, as an example. When this pressure is exceeded, the diaphragm 3 will open the channel 7 for the passage of the gas and as a consequence the desired pressure in the body cavity will be maintained practically at a constant level by the required opening and closing movements of the diaphragm 3.

The entire control of the gas pressure will thus be performed automatically and without any manual manipulation whatsoever by the attending personnel. However, if desired, an additional pressure control could be conveniently introduced by connecting a pressure gauge (not shown) to the conduits 6, 6a, 6b. In addition to this gauge or, as a substitute for the same, a safety device can be connected to the discharge conduit 6a, 6b. This safety device consists of the receptacle 28 and the tube 29. In this safety tube 29 the same level of liquid as the one in the tube 10' is normally maintained, but if by some circumstance, that is, if the diaphragm valve should not operate with the required sensitivity, or that an obstruction in the flow of gas should present itself in the conduit to the tube 10', the level of the liquid in the tube 29 will call the same to the attention of the person watching the instrument, so that in case of need the gas flow to the body cavity can be regulated manually using the valve handle 31a.

The valve body 1, the tubes or hoses 10 and 29, and the receptacles 16 and 28 may conveniently be made of transparent plastic material. Colored floats (not shown) may be placed in these tubes in order to make the height of the columns of liquid more readily visible.

The invention is not limited to the embodiment referred to in the drawing. For example a valve body or cone may be fixed to the diaphragm 3, which in its closed position cooperates with the orifice of the channel 7. The device is in principle also useful to other applications than medicine and surgery.

I claim:

1. A device for automatically maintaining a predetermined excess gas pressure in cavities comprising a diaphragm valve body having a recess and three channels extending therethrough to said recess, a diaphragm positioned across said recess, a seat retaining said diaphragm across said recess and having an opening therethrough to a side of said diaphragm opposite to said three channels, one of said valve body three channels being capable of connection to a source of gas under pressure, a discharge conduit for connection to the cavity being connected to a second of said valve body three channels, a third of said valve body three channels being open at one end and capable of having its opposite end opened and closed by said diaphragm, a flexible tube containing a liquid and having a medial portion with a U-shaped configuration positioned below said seat, a leg of said tube extending upwardly from said tube medial portion and connected to said seat opening, a second leg of said tube also extending upwardly from said tube medial portion, being adjustably supported and extending parallel to said seat opening whereby said liquid will tend to move said diaphragm to a position closing said third body channel, but opening the same for the escape of gas therethrough upon a predetermined gas pressure being exceeded in said second body channel until said gas pressure is reduced.

2. A device for automatically maintaining a predetermined excess gas pressure in cavities as claimed in claim 1 including a C-shaped bracket having a pair of arms with one of said arms supporting said tube portion and a screw in threaded engagement with the other of said arms and having said valve body and seat positioned between said screw and said first arm.

3. A device for automatically maintaining a predetermined excess gas pressure in cavities as claimed in claim 1 including a plate with a measuring scale, a rod connected to said plate and extending along said measuring scale, and means adjustably connecting said tube portion to said rod.

4. A device for automatically maintaining a predetermined excess gas pressure in cavities as claimed in claim 1 including a closed receptacle containing a liquid, a second tube containing a liquid extending into said receptacle and alongside said tube portion, said discharge conduit being connected to and in communication with said receptacle and a further discharge conduit for connection to the cavity being in communication with said receptacle.

References Cited

UNITED STATES PATENTS 3,099,262   7/1963   Bigliano _____ 128—2.05

FOREIGN PATENTS 494,757   7/1953   Canada.

OTHER REFERENCES

Gruber, German printed application 1,091,391, October 1960.

HENRY T. KLINKSIEK, *Primary Examiner.*